US011465021B2

(12) United States Patent
Martínez Fierro

(10) Patent No.: US 11,465,021 B2
(45) Date of Patent: Oct. 11, 2022

(54) COMPACT GOLF CART

(71) Applicant: Jorge Ramón Martínez Fierro, Mexico City (MX)

(72) Inventor: Jorge Ramón Martínez Fierro, Mexico City (MX)

( * ) Notice: Subject to any disclaimer, the term of this patent is extended or adjusted under 35 U.S.C. 154(b) by 259 days.

(21) Appl. No.: 16/331,788

(22) PCT Filed: Nov. 21, 2017

(86) PCT No.: PCT/MX2017/000133
§ 371 (c)(1),
(2) Date: Mar. 8, 2019

(87) PCT Pub. No.: WO2019/103589
PCT Pub. Date: May 31, 2019

(65) Prior Publication Data
US 2021/0362016 A1 Nov. 25, 2021

(51) Int. Cl.
*B62K 7/04* (2006.01)
*A63B 55/60* (2015.01)
(Continued)

(52) U.S. Cl.
CPC .................. *A63B 55/61* (2015.10); *B62J 1/12* (2013.01); *B62K 25/08* (2013.01); *B62K 25/283* (2013.01);
(Continued)

(58) Field of Classification Search
CPC ...... A63B 55/61; A63B 2055/602; B62J 1/12; B62J 1/08; B62J 9/12; B62J 9/14;
(Continued)

(56) References Cited

U.S. PATENT DOCUMENTS 3,301,036 A * 1/1967 Davis, Jr. ............... B21D 7/063
72/460
4,513,989 A * 4/1985 Czajkowski ............ B62B 1/042
280/42
(Continued)

FOREIGN PATENT DOCUMENTS

AU 2013258865 1/2015
ES 1030530 8/1995

OTHER PUBLICATIONS

Az Scooter, "Fat Tire Golf Scooter Riding and Safety Tutorial," YouTube, Jul. 13, 2017, https://www.youtube.com/watch?v=PxGU-wTRGyE.

*Primary Examiner* — Kevin Hurley
*Assistant Examiner* — Marlon A Arce
(74) *Attorney, Agent, or Firm* — Carmody Torrance Sandak & Hennessey LLP

(57) ABSTRACT

This invention refers to a vehicle specifically designed to be used as transportation during a golf game. It is an individual transportation vehicle that includes three main support structures: one front structure, one intermediate structure, and one rear structure, where a couple of tires are located, as well as a support mechanism to keep the vehicle standing, a leveling clamping mechanism for a bag for the golf clubs, and many accessories that allow the driver to safeguard and access to several useful elements during the game, such as the scorecard, the golf balls, the support tees, mobile devised and even drinks, all of them safeguarded in a cavity underneath the seat. The vehicle is designed to meet with the regulations that rule vehicles authorized to move within the terrain of a golf course.

26 Claims, 8 Drawing Sheets

(51) Int. Cl.
 *B62J 1/12* (2006.01)
 *B62K 25/08* (2006.01)
 *B62K 25/28* (2006.01)
 *B62M 7/12* (2006.01)
 *B62K 21/12* (2006.01)
 *B62K 23/04* (2006.01)
 *B62K 23/06* (2006.01)

(52) U.S. Cl.
 CPC ......... *B62M 7/12* (2013.01); *A63B 2055/602* (2015.10); *B62K 21/12* (2013.01); *B62K 23/04* (2013.01); *B62K 23/06* (2013.01); *B62K 2202/00* (2013.01); *B62K 2204/00* (2013.01)

(58) Field of Classification Search
 CPC ... B62J 11/04; B62J 11/05; B62J 11/26; B62J 43/16; B62J 43/28; B62K 25/08; B62K 25/283; B62K 21/12; B62K 23/04; B62K 23/06; B62K 2202/00; B62K 2204/00; B62K 11/10; B62M 7/12; B62H 1/04; B62L 3/02; B62L 3/06
 See application file for complete search history.

(56) References Cited

U.S. PATENT DOCUMENTS

| | | | |
|---|---|---|---|
| 4,573,549 A | 3/1986 | Pankow | |
| 4,767,133 A | 8/1988 | Yamada | |
| 4,848,504 A * | 7/1989 | Olson | B62K 5/01 280/DIG. 6 |
| 4,874,055 A * | 10/1989 | Beer | B60L 50/66 180/215 |
| 6,390,216 B1 * | 5/2002 | Sueshige | B60K 1/04 180/68.5 |
| 6,715,774 B2 * | 4/2004 | Cassoni | A63B 55/60 280/DIG. 6 |
| 7,631,715 B2 * | 12/2009 | Falkiner | B62K 5/027 297/188.1 |
| 11,260,935 B2 * | 3/2022 | Reimers | B62M 6/45 |
| 2020/0324844 A1 * | 10/2020 | Macdonald | B62J 9/30 |
| 2020/0376355 A1 * | 12/2020 | Reimers | B62J 17/08 |

* cited by examiner

COMPACT GOLF CART

INVENTION FIELD

As mentioned in the title of this descriptive report, this invention belongs to the transportation and sports industries. Pertaining specifically to the transportation field within the golf sport. Specifically, to a motorized two-tired vehicle, whose preferential use addressed to said sport.

SUBJECT MATTER OF THE INVENTION

This invention refers to a motorized two-tired vehicle specifically designed to play golf. In its handlebar it has incorporated a piece to support the scorecard. The steering column is designed to support any type of mobile device, in addition to the golf balls. The lower part includes cup holders. Behind the seat there is a universal base to support any type of umbrella. Behind the driver's seat, there is a small basket designed to mount the golf clubs. The seat has dual function, since it serves as cap for a cavity that operates as a cooler.

BACKGROUND

In the sport industry, considerable amounts of money are spent in the maintenance of golf courses. The current golf carts generally have four tires and two seats, and weight around 450 kilograms, which make them very heavy and damage the lawn significantly. That is why, it has been sought a way to reduce the maintenance cost of the lawn to the minimum making variations to the transportation means used in this sport.

Additionally, depending of the experience of the players, the difficulty of the land and climate conditions during the day, the time invested in a game can be a very long period. The use of individual transportation vehicles for each player can significantly reduce the total duration of the game, when allowing independent displacement of the ball when it lands on the ground.

Currently, there are several means of transportation that are adequate to transport the golf players and their equipment, which are described next.

We refer to record of patent registry of Australian publication number AU2013258865, where a small electric golf cart caddy type of four tires is described, which allows displacement of one person only with his golf bag and other accessories. This cart has an energy storing system that provides power to the driving system.

The document ES1030530 consists of a motorized three-tired vehicle that is characterized because it has a totally removable tubular metallic chassis.

The industrial design CN200630107965.7 shows us a three-tired golf cart that differs from the other already referred to in that the golf bag is placed in front of the handlebar.

The industrial design CN20063010796601 describes a four-tired golf cart whose golf bag is also place in front of the handlebar.

The industrial design FR977535-0001 describes an electric golf cart for one person, which includes two stands to place the golf clubs in the rear area. It also has a structure where an umbrella is placed. In front of the handlebar, there is attached a small basket to place personal items.

The industrial design SE2001-0471 is a golf caddy that only has one stand to place the golf clubs between the seat and the handlebar.

Currently, there are no motorcycles to be used exclusively in golf and that have a handlebar where the scorecard can be incorporated, and cup holders in the lower part; as well as a piece designed to support any type of cellular phone (since the use of mobile phones is widespread, there are mobile applications for this type of sport) and golf balls. Additionally, with the use of the invention herein described, large amounts of money can be saved in maintenance expenses of the lawn in golf courses, and can speed up the round in at least two hours. The integrated tires in the current invention are designed for this type of land and no damage to the lawn is likely to result from its use.

DETAILED DESCRIPTION OF THE INVENTION

Figure 1:
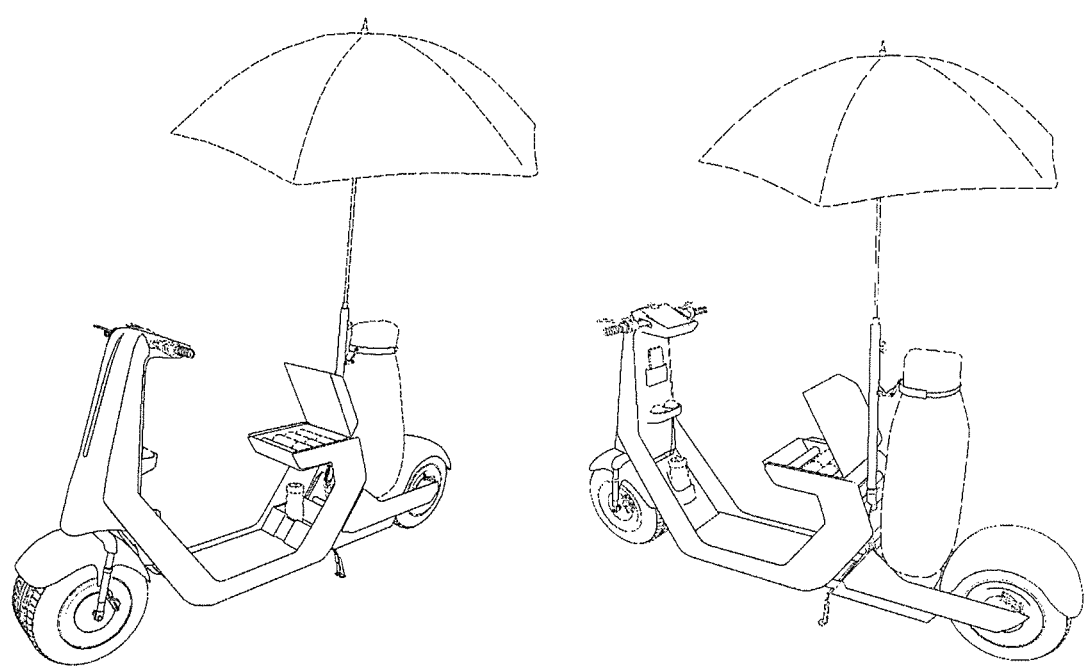
FIG. 1.—Front and rear isometric views of a modality of the compact golf vehicle.
Figure 2:
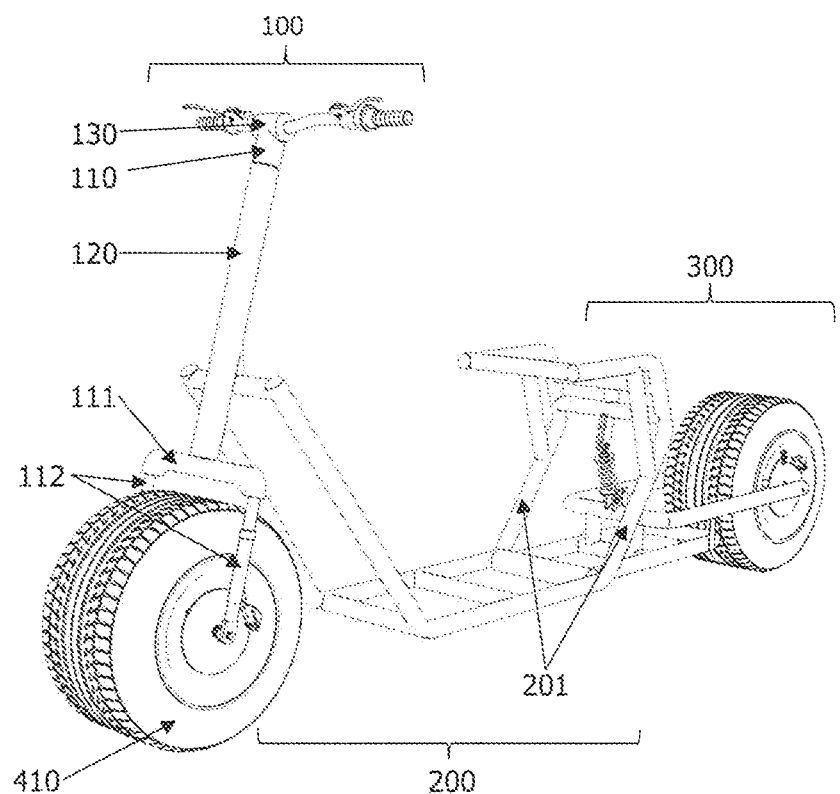
FIG. 2.—Front isometric view of the frame.
Figure 3:
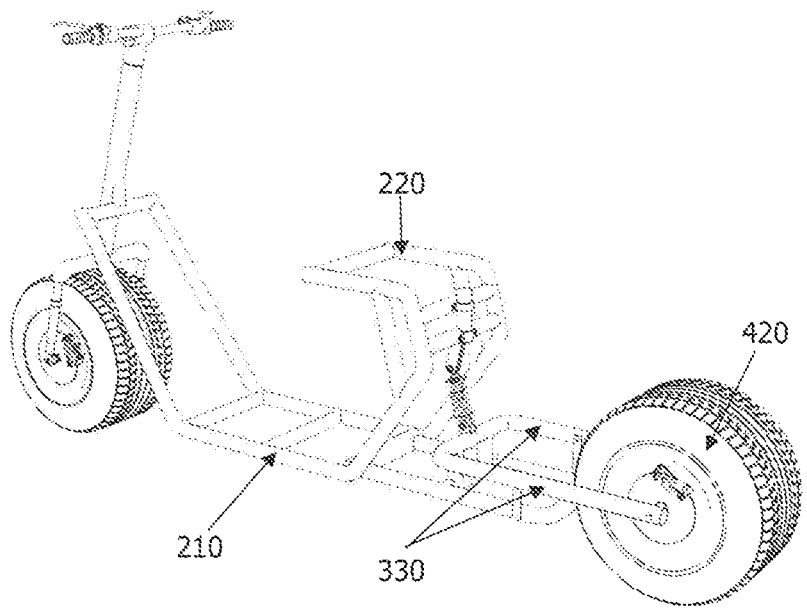
FIG. 3.—Rear isometric view of the frame.
Figure 4:
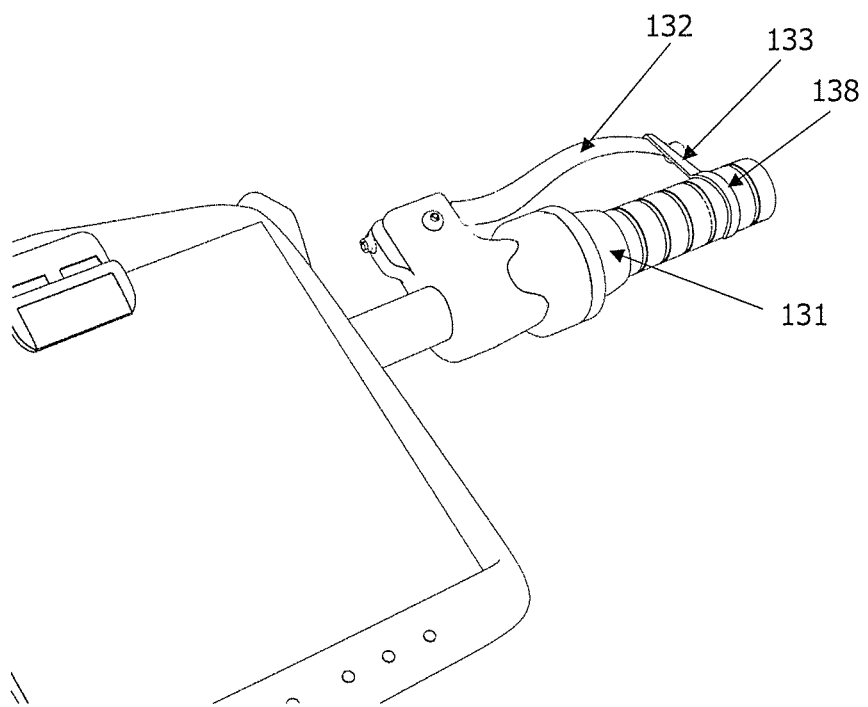
FIG. 4.—Isometric view of a modality of the acceleration and braking system, including the brake locking mechanism.
Figure 5:
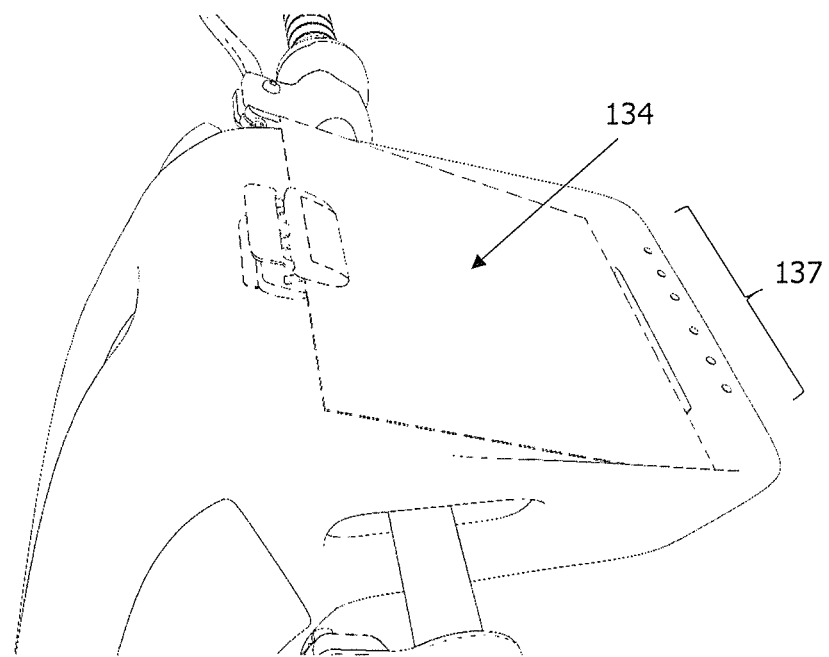
FIG. 5.—Isometric view of a modality of the support for the scorecard and the cavities for tee supports.
Figure 6:
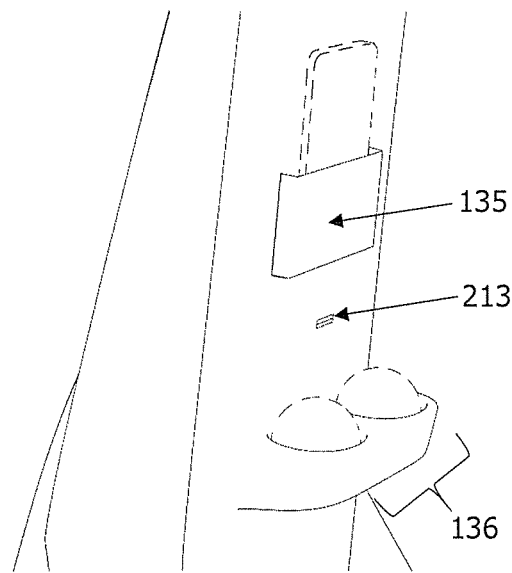
FIG. 6.—Isometric view of a modality of support for mobile devices, support for the golf balls, and the charge port for mobile devices.
Figure 7:
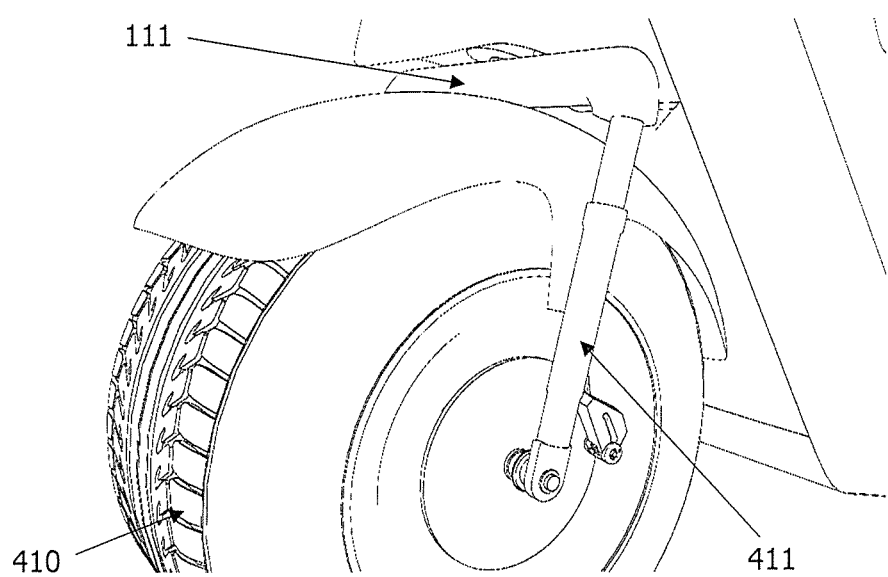
FIG. 7.—Isometric view of a modality of the front suspension system.
Figure 8:
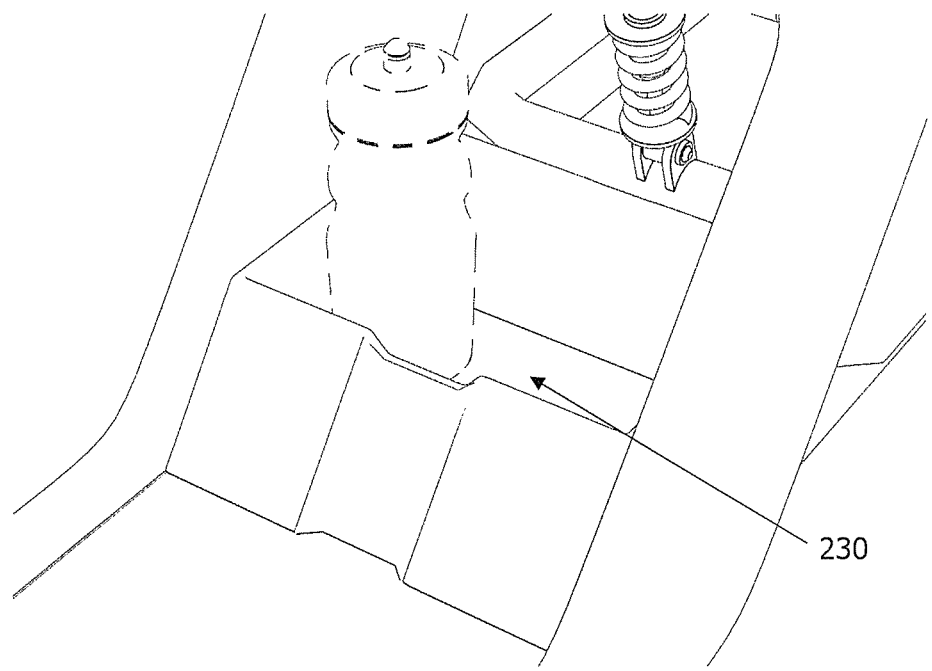
FIG. 8.—Isometric view of a modality of the intermediate support frame, specifically in a modality of location of the object stand cavity.
Figure 9:
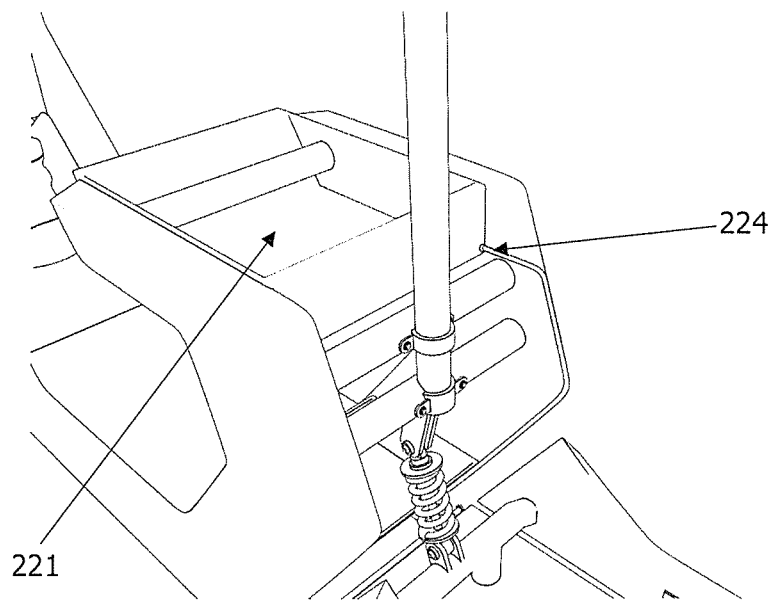
FIG. 9.—Isometric view of a modality of the housing cavity located underneath the vehicle seat.
Figure 10:
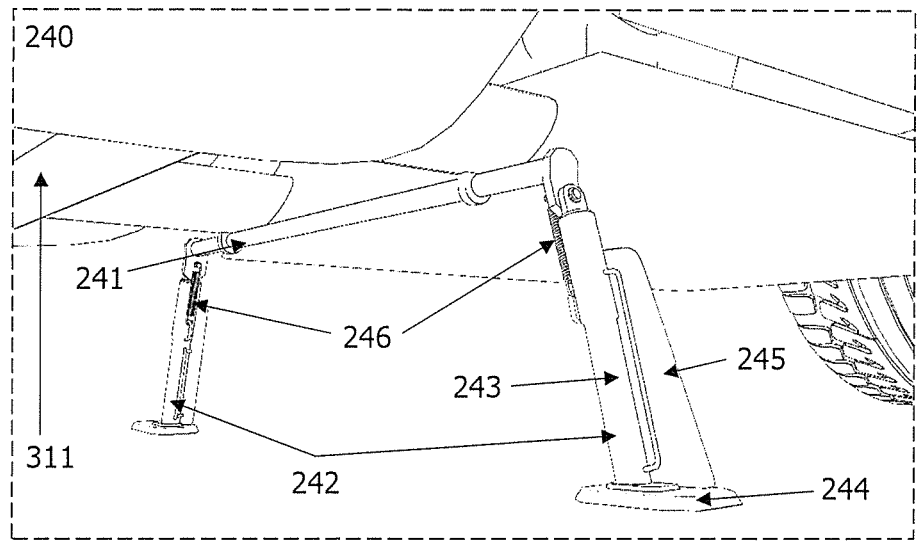
FIG. 10.—Isometric view of a modality of the support mechanism located in the lower part of the intermediate support frame.
Figure 11:
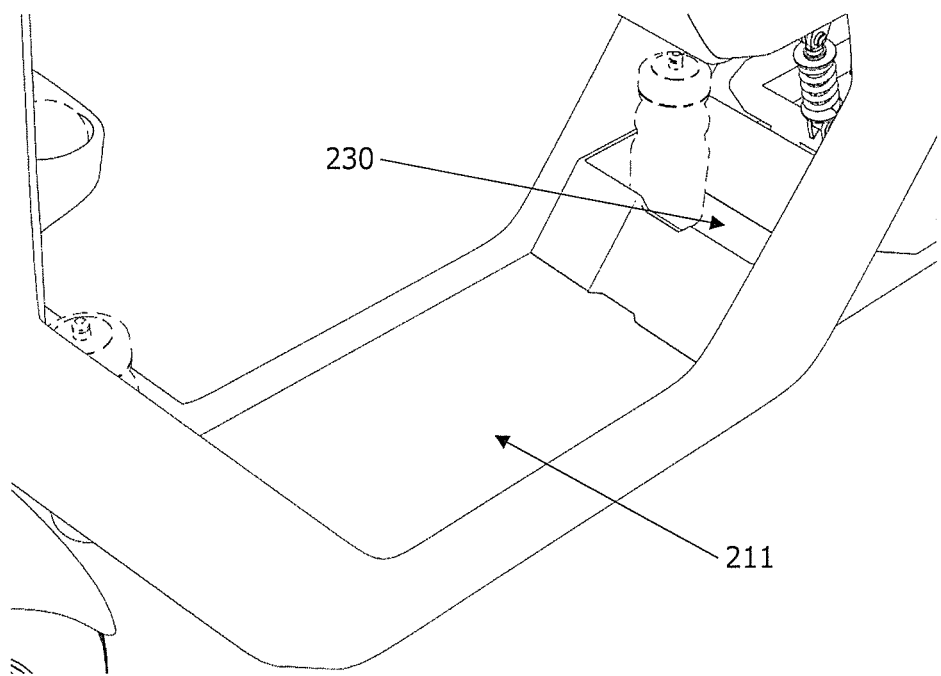
FIG. 11.—Isometric view of a modality of the housing cavity of the intermediate support frame.
Figure 12:
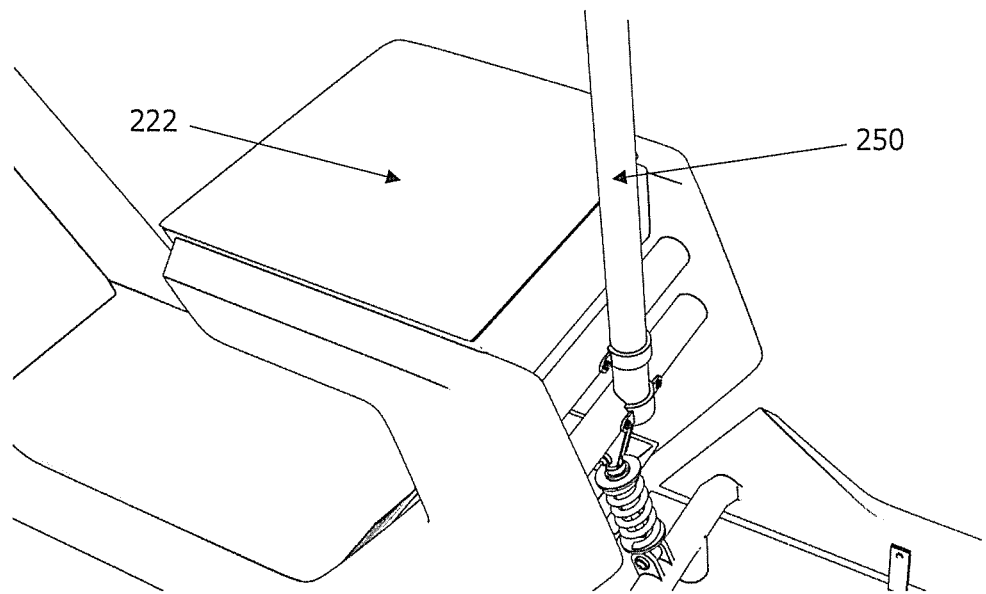
FIG. 12.—Isometric view of a modality of the support for the umbrella.
Figure 13:
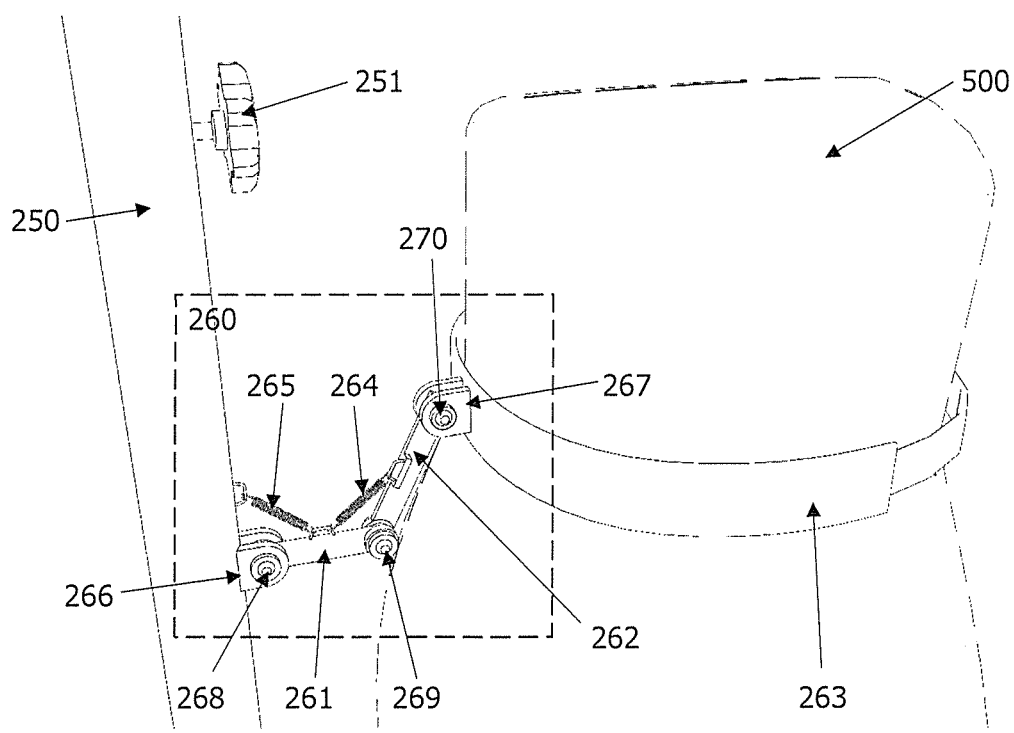
FIG. 13.—Isometric view of a modality of the leveling clamping mechanism.
Figure 14:
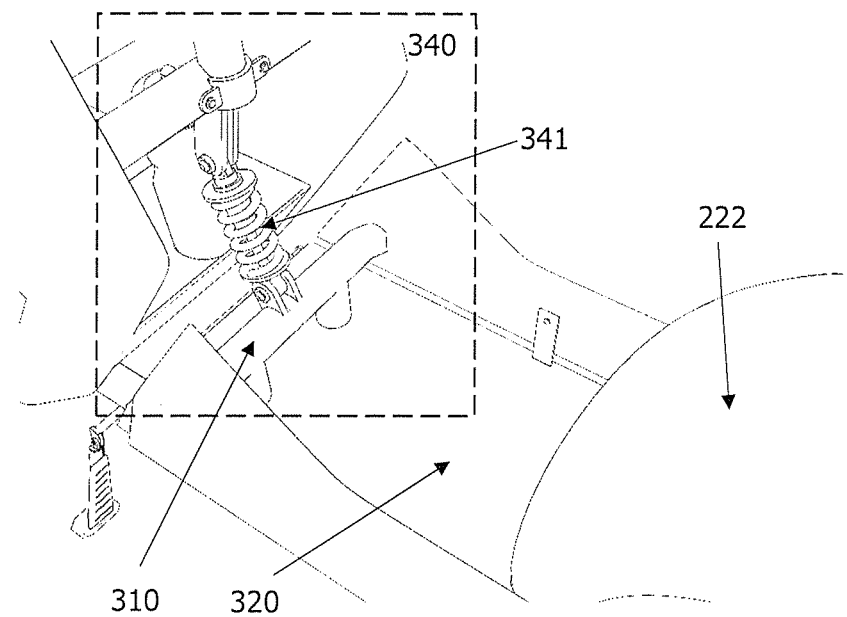
FIG. 14.—Isometric view of a modality of the floating axis, the rear suspension, and the cavity of the rear support frame.
Figure 15:
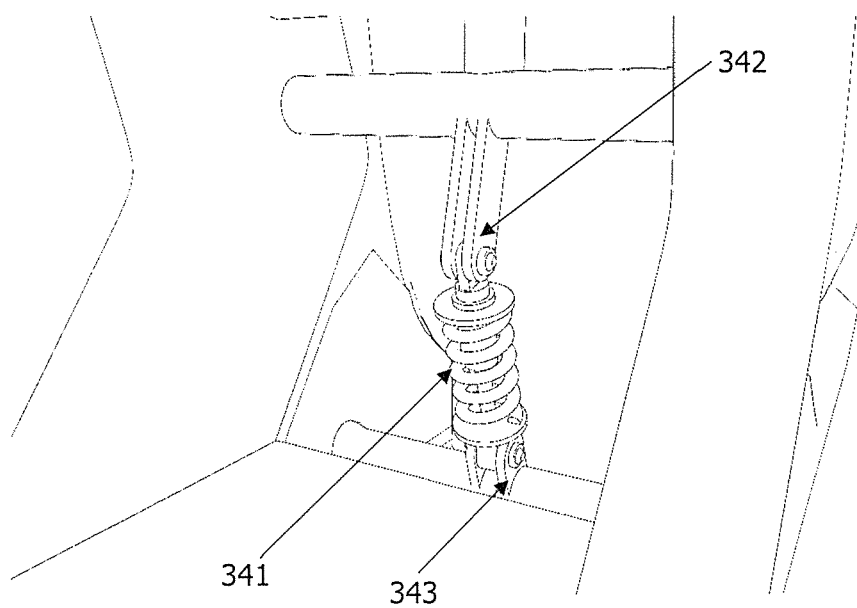
FIG. 15.—Isometric view of a modality of the rear suspension.

This descriptive report comprises structural improvements in the configuration of a vehicle specially designed to meet the requirements of traffic in golf courses, and increase the advantages of transportation during the game. It should be clarified that the final user of this invention will be called driver or player, indistinctly, according to the context given by the wording.

The vehicle comprises mainly a base structure or frame, a handlebar with steering system, a couple of tires, a drive train system, a seat, a support mechanism, an independent rear suspension system, and several accessories that allow placing and/or securing diverse objects to the vehicle frame.

The structure comprises a light material frame, including without limitation: steel or aluminum; where tubes or beams made with said materials are joined together to form different structures. The frame is covered by body parts made of a light material and variable design that provide a shape to the vehicle and allows the installation of the accessories. Although the frame can show several configurations, it has at least three main sections: a front support structure (100) for the handlebar, the steering system and the front tire; an intermediate support structure (200) for the seat and the foot rest, and a rear support structure (300) for the rear suspension and rear tire.

The front support structure (100) includes at least a tube (120) that serves as guide for a vertical axis (110) inserted in the tube and joined to the handlebar (130), where in the lower part of the axis there is a horizontal bifurcation (111) from which a couple of side arms extend (112), which in turn serve as support for the axis of the front tire (410).

The handlebar (130) with the steering system located in the front support structure includes a commercial acceleration and braking system placed in the handles of the handlebar, where the accelerator comprises a rotating handle traditional system (131) which has to be activated to accelerate the vehicle drive train system, and where the brake includes a traditional lever system (132) placed in front of the accelerator, which has to be pressed against the accelerator to stop the vehicle. Additionally, a secure brake mechanism is located in at least one of the handles of the handlebar. Said mechanism comprises a hook (133) that is attached to the accelerator rotating handle (131), where the length of the hook covers the distance between said handle and the brake lever (132), holding the brake lever in its pressed position, that is to say, braking the vehicle. When the hook (133) releases the brake lever (132), the vehicle can move forward normally. Moreover, in the center of the front support structure a support for the scorecards is located (134). Likewise, the front support structure has a support (135), which looks like a cavity, where mobile communication devices can be placed while the driver is being transported in the vehicle. Also, the front support structure has a couple of supports (136) for the golf balls and several cavities (137) to place tees, which are special designed supports to set the ball in the ground, so the player can hit it.

The intermediate support structure (200) is attached to the front support structure (100), preferably to the guide tube (120) of such front support structure. Said intermediate structure (200) has a configuration where its elements make up primarily of a couple of horizontal frames joined together for at least two vertical elements (201), where the first frame (210) is a rectangular structure located close to the ground which is meant to support the driver's feet; the second frame (220) is also a rectangular structure but smaller than the first frame, which is elevated so that it serves as support for the vehicle seat.

The first frame (210) of the intermediate support structure comprises an upper face (211) which functions as support for the driver's feet while he is driving the vehicle; the interior of the structure is the cavity that safeguards the power source that feeds the vehicle, particularly to the drive train system and to the electric power output port (213), which operates as electrical connection and supply source. Additionally, with the pieces of the body installed on the frame, the first frame has at least one cavity to hold a variety of objects (230), preferably one in the front section and other underneath the seat structure, which serve as holders for liquid containers such as water bottles, or containers of sand with seeds that are often used during the golf game, in addition to have enough space for other types of small items such as keys, cards, wallets, etc. It will be obvious for a person skilled in the art that the geometry of the cavities can vary without affecting their function.

In the lower face of the intermediate support structure (200), a support mechanism is installed (240) which comprises a couple of legs (242) joined in angle to the ends of a horizontal axis (241), which in turn is attached to said intermediate structure. The horizontal axis (241) allows the vertical and simultaneous rotation of the legs (242), so they can be adjusted from a vertical position to a horizontal position parallel to the lower surface of the intermediate support structure. Each leg is comprised by a main beam (243) that is attached in one end to the horizontal axis (241), a support surface (244) perpendicularly attached to the opposed end and one fin (245) longitudinally attached to the beam, and optionally to the support surface. The fin (245) facilitates the change of position of the legs, where the driver can move them putting his foot in any of the faces of the fins and impelling the legs to change their position. The length of the legs (242) is lower than the distance there is between its attachment to the horizontal axis and the ground, in a way that when the legs are in vertical extended position and the vehicle is in state of rest, the latter can tilt toward any of the sides to rest on the ground.

In the elevated frame (220) of the intermediate support structure there is a housing cavity (221). The walls of the cavity are designed with insulating materials so that cavity will function as drinks or food storage that have to be at a certain temperature, including but not limited to cold drinks. The storage cavity includes a cap (222) attached at least to one of the walls of the cavity through rotating elements, such as hinges, and made also of insulated material, whose external face is covered by cushioning material in such a way as to function as the vehicle seat. Moreover, said cavity also has a drain (224) which allows draining the liquid accumulated inside of it.

In the rear section of the intermediate support structure, behind the seat, there is a support for an umbrella, which is comprised by a tube (250) vertically attached to the frame of said structure. The tube (250) allows coupling of any commercial umbrella through the insertion of the axis of the support of said umbrella inside the tube. To hold the umbrella, the support includes also an adjustment element (251) that pressures the umbrella against the wall of the tube.

In addition, over the seat level and on the opposite side, the tube (250) has attached a leveling clamping mechanism (260), which secures the golf club bag (500) to the vehicle during its transportation. This mechanism comprises an articulated connection of at least two elements (261, 262) connected to one another through means that allow its rotation in at least one direction, such as a bolt or cap screw, where the elements can be beams or tubes, among other logic elements for a person skilled in this field, which allows to make an articulated connection of elongated elements. A first element (261) is attached to the tube in its end opposite to the joint with the second element. The second element (262) is attached to a clamp (263) in its end opposed to the joint with the first element. The clamp (263) can be of fixed or adjustable length, through arms of defined dimensions or extensible elements, fixed or elastic, in such a way that it secures the golf club bag (500) to be transported in the rear part of the vehicle. The mechanism comprises at least one elastic element (264), which is attached to both elements (261, 262) of the articulated connection, in a way that it keeps them in an angle set position, which can be modified within the limits allowed by the elastic element.

The rear support structure (300) includes a rectangular frame (310) place in horizontal position attached to the intermediate support structure through a floating axis. An axis of the intermediate support structure (200) is inserted into a tube (311) of the rear support structure (300), in such a way as to remain embedded, thus, allowing the rear structure to revolve around the axis, since the tube (311) has a larger diameter than the axis. A portion of the rectangular and horizontal frame form an upward concave cavity (320), from which a couple of lateral arms (330) are projected with direction to the rear part of the vehicle, which serve as support for the axis of the rear tire (420). Additionally, the rear support structure (300) comprises a rear suspension (340) attached also to the intermediate support structure, which dampen the irregularities found in the golf course and limit the movement of the rear structure due to the floating axis. The rear suspension is comprised by at least a shock absorber (341) attached to both intermediate and rear support structures.

The body that covers the frame of the rear support structure forms a cavity (320) where the golf bag (500) to transport during the vehicle use can be placed. Said bag is supported within the cavity and is held in place with the clamp (263) of the del leveling clamping mechanism.

The vehicle tires include a drive train system that is built in inside of its structure; for example, within the rim that supports the tire. This type of drive train systems is commercial, and its specific design is not part of the scope of this invention.

When the vehicle is moving through the golf course, the irregularity of the terrain can make that the rear support structure (300) changes its position in relation to the rest of the vehicle within the limits allowed by the floating axis (311) and by the rear suspension mechanism (340). In this case, the leveling clamping mechanism (260) allows that the golf bag (500) placed in the cavity (320) of said rear structure and secured with the clamp (263) of said leveling clamping mechanism can move according to the position of the rear support structure, preventing that the golf bag falls off from the vehicle.

Preferred Approach of the Invention

For the realization of the invention described in this descriptive report, is preferably to consider certain configurations; for example, the configuration of the leveling clamping mechanism or the design of the lower support system.

Some of the aspects to consider, included but not limited to, are specified below, as well as their embodiments that have served to reach the result proposed by this invention. It should be clarified that the inclusion of the following information does not limit the modification of aspects either included in this descriptive report or not, and that any modification and/or combination of one or several of said aspects must be considered as a different modality of this invention. Likewise, the combination of one or several of the following preferred embodiments shall be considered within the potential scope of the invention disclosed herein.

In one preferred embodiment of this invention, there is a pair of fenders attached to the vehicle body. The first one is attached to the front support structure (100) covering the upper portion of the front tire (410), and the second fender is attached to the rear support structure (300), covering the upper portion of the rear tire (420).

In another preferred embodiment of this invention, the brake locking mechanism includes a hook (133) attached to the handle (131) of the accelerator through a bracket (138) that surrounds the handle. The position of the hook (133) is horizontal when the vehicle is in state of rest and without acceleration; this position secures the break handle (132) in a tight position, that is, in a braking position. Corresponding to the hook position, the brake handle includes a groove or slit that receives the hook (not illustrated). To accelerate the vehicle, the driver should rotate the accelerator handle (131) backwards as any traditional acceleration system in this type of vehicles; in this case, since the hook (133) is fixed to the handle (131), said hook is lifted and releases de brake handle (132), allowing the driver to move forward. The brake locking mechanism keeps the vehicle brakes applied, in such a way that they keep it in a fixed position while the driver is not driving.

In another preferred embodiment of this invention, the support (136) for the golf balls is in the middle of the handlebar, underneath the support (135) for mobile devices.

In another preferred embodiment, the cavities (137) to place the tees are located in the lower edge of the scorecard support (134), so that they are easily accessible to the player.

In another preferred embodiment, the front support structure (100) has a couple of shock absorbers (411) installed in the lower ends of each lateral arm which support the front tire axis, forming a front suspension mechanism for the vehicle.

In another preferred embodiment of this invention, the drive train system is an electrical drive train system commercially found of the type that is built in into the rear tire (420), so that it does not occupies additional space in the vehicle support structures.

In another preferred embodiment of this invention, the energy source safeguarded in the cavity underneath the upper surface (211) of the intermediate support structure is a bank of electric batteries, which is used to supply the vehicle drive train system and the electric power output port (213).

In another preferred embodiment of this invention, the electric power output port (213) has a connection for mobile devices, which may include but are not limited to a USB plug (connection) of any type.

In another preferred embodiment of this invention, the adjustment element (251) for the umbrella support includes a screw with a handle attached to one end of the screw. The screw crosses the tube (250) through a hole, makes contact with the umbrella and pushes it against the tube internal wall.

In another preferred embodiment of this invention, the vehicle tires (410, 420) are designed according to the regulations that rule the type of vehicles that can circulate within a golf course.

In another preferred embodiment of this invention, each leg (242) of the support mechanism additionally comprises an elastic element (246), such as spring, attached to an end of the horizontal axis (241) and in the opposite end to a point along the beam (243) of the leg, so that the elastic element (246) stays in a state of rest when the leg is in horizontal or vertical position, and it changes to a elongated position when the leg is in an angle with respect to the vertical or horizontal plane. Thus, the leg can be fixed by the elastic action of the spring in one of the two positions, that is, horizontal retracted position and vertical extended position.

In another preferred embodiment of this invention, the attachment of each leg (242) of the support mechanism to the horizontal axis (241) occurs through a plate (not illustrated) attached and fixed to said axis (241), where the plate has a geometry that defines two perpendicular channels among them: a first vertical channel and a second horizontal channel, where the channels are separated by an elevation of the plate, whose diameter is congruent with the diameter of the beam of the legs. The plate channels receive the arm of the leg in a horizontal position and a vertical position respectively. The operation of this approach recalls that of the support leg of a bicycle, where the elasticity of the material of the leg, in order to change its position, has to overcome the pressure exerted by an elevation.

In another preferred embodiment of this invention, the rear suspension mechanism (340) comprises a hydraulic shock absorber in each end, in an is articulated manner, and joined by means of bolts or cap screws to a couple of anchors. A first anchor (342) is attached to the intermediate structure and a second anchor (343) to the rear structure, specifically to the frame that comprises the vehicle seat and to the frame that comprises the rear cavity; here, the bolts serve as rotation axis for the suspension articulation.

In another preferred embodiment of this invention, the leveling clamping mechanism (260) includes at least six elements: two bolts anchors (266, 267), two arms (261, 262) and two elastic elements (264, 265). A first anchor (266) is rigidly fixed to the tube (250). A first arm (261) is attached in one end to the first anchor (266) through a bolt (268) that allows it vertical rotation and its opposite end it is attached to a first end of a second arm (262) also in an articulated manner by means of another bolt (269). The second end of the second arm (262) is articulately attached to a second anchor (267), similar to the joint of the first arm with the first anchor, by means of another bolt (270). A first elastic element (264) is attached to an end of the tube (250) and in the other end to the first arm (261), thus, said first arm is kept in a flexible perpendicular-horizontal position. A second elastic element (265) is attached to the middle part of both arms (261, 262), so that the mechanism keeps the relative position of the arms in an angle smaller than 180°. The elastic element can be, by way of example and without limitation, a spring or an elastic band, among other elements that are obvious to a person skilled in the art that can meet the operation described in this descriptive report. The second anchor is located rigidly attached to the clamp.

The invention claimed is:

1. A compact golf cart of the type that comprises a base frame covered by a vehicle body, front tire and a rear tire, characterized in that it comprises:
   a front support structure comprising a vertical axis attached to a handlebar and inserted into a guide tube, in which lower end there are a pair of supports for the front tire, wherein the handlebar comprises a handle-acceleration system and a lever braking system;
   an intermediate support structure attached to the guide tube of the front support structure, comprising a support tube attached to a bag support that includes a clamping leveling mechanism comprising a hinged connection formed and at least two horizontal frames joined by at least two vertical elements joined at an end by one bolt, wherein: the first element is attached to the support tube, and the second element is attached to a clamp; and wherein at least one spring element is attached to both elements and at least two horizontal frames joined by at least two vertical elements, and comprising a seat;
   a rear support structure is attached to the intermediate support structure by means of a floating axis and a rear suspension, comprising a rectangular horizontal frame from which two lateral arms are projected as support for the rear tire; and
   a support mechanism attached to the lower face of the intermediate support structure, comprising a horizontal axis and one or more folding legs joined in angle to the ends of the axis.

2. The compact golf cart according to claim 1, characterized in that the pair of supports for the front tire comprises a pair of side arms joined to the axis of said front tire; and
   the front support structure has a pair of shock absorbers installed on the lower ends of each side arm that supports the front tire axis.

3. The compact golf cart according to claim 1, characterized in that a pair of fenders are joined to the vehicle body, wherein:
   the first fender is attached to the front support structure covering the upper portion of the front tire; and
   the second fender is attached to the rear support structure covering the upper portion of the rear tire.

4. The compact golf cart according to claim 1, characterized in that the vehicle further comprises a drive train system consisting of an electric drive train system of the type that is built in the rear tire.

5. The compact golf cart according to claim 1, characterized in that an acceleration system is through a rotating handle, and
   the lever braking system includes a brake locking mechanism comprised by a hook attached to the accelerator rotating handle, wherein the hook locks the brake lever and releases it when the accelerator handle is rotated.

6. The compact golf cart according to claim 5, characterized in that the hook of the brake locking mechanism is attached to the accelerator handle by means of a bracket that surrounds the handle, wherein the brake lever comprises a notch, slit or groove that receives the hook.

7. The compact golf cart according to claim 1, characterized in that the tube support includes an adjustment element attached to its rear part; and
   the umbrella support adjustment element comprises at least one screw that crosses through the tube of said support through a hole, wherein the screw has a handle attached to its outer end.

8. The compact golf card according to claim 1, characterized in that the clamping leveling mechanism comprises at least six elements: two bolt anchors, two arms and two spring elements, wherein a first anchor is joined to the umbrella support tube of the intermediate support structure, a first arm is attached in one end to the first anchor by means of a bolt that allows it to rotate, and on its opposite end it is attached to a first end of a second arm, also in a hinged manner by means of another bolt, wherein the second end of the second arm is attached to a second anchor in a hinged manner similar to the attachment of the first arm with the first anchor by means of another bolt, wherein a first spring element is attached in one end to the umbrella support tube of the intermediate support structure, and on other end to the first arm, so that said first arm is kept in a flexible perpendicular-horizontal position, wherein a second spring element is attached to the middle part of both arms so that the mechanism keeps the relative position of the arms at an angle lower than 180°, wherein the second anchor is rigidly attached to the clamp; and
   the length of the clamp can be fixed or adjustable, by means of arms of defined dimensions or extensible elements, whether fixed or flexible.

9. The compact golf cart according to claim 1, characterized in that the first horizontal frame of the intermediate support structure forms a support for the feet of the vehicle driver and a safeguard cavity for a power source.

10. The compact golf cart according to claim 1, characterized in that the seat is formed by the second horizontal frame of the intermediate support structure, the seat has a lid that covers a housing cavity with at least one drain, wherein the walls of the cavity and the lid are made of insulating materials; and wherein the lid is attached to at least one of the walls by rotating elements and whose external upper face is covered by a cushioning material.

11. The compact golf cart according to claim 1, characterized in that the floating axis that joins the intermediate support structure with the rear support structure comprises an axis of the intermediate support structure that is inserted into a tube of the rear support structure with a diameter larger than the diameter of said axis.

12. The compact golf cart according to claim 1, characterized in that the rear suspension comprises a shock absorber that is attached in a hinged manner by means of anchors and bolts to the intermediate support structure on one end and to the rear support structure on the opposite end.

13. The compact golf cart according to claim 1, characterized in that the horizontal rectangular frame of the rear support structure conforms a concave cavity.

14. The compact golf cart according to claim 1, characterized in that the legs of the support mechanism comprise a beam, a support surface attached to the free end of each beam and a fin longitudinally attached to each beam.

15. The compact golf cart according to claim 14, characterized in that each leg of the support mechanism comprises at least one spring element attached on one end to the horizontal axis and to the beam of the leg by the opposite end.

16. The compact golf cart according to claim 14, characterized in that each leg of the support mechanism comprises a plate that connects the horizontal axis with each arm, wherein the plate has a geometry that defines two channels that are perpendicular to each other: a first vertical channel and a second horizontal channel, wherein the channels are separated by an elevation of the plate and whose diameter is congruent with the diameter of the beam of the legs.

17. The compact golf cart according to claim 1, characterized in that the cart further comprises a variety of accessories that include:
 at least one support for mobile devices located,
 a scorecards holder located in the center of the handlebar,
 a set of cavities for tees,
 at least one support for golf balls located,
 at least one storage cavity and
 at least one electrical power outlet port connected to a power source.

18. A compact golf cart of the type that comprises a base frame covered by a vehicle body, front tire and a rear tire, characterized in that it comprises:
 a front support structure comprising a vertical axis attached to a handlebar and inserted into a guide tube, in which lower end there are a pair of supports for the front tire, wherein the handlebar comprises a handle-acceleration system and a lever braking system, wherein the lever braking system comprises a brake locking mechanism comprised by a hook attached to the accelerator rotating handle, wherein the hook locks the brake lever and releases it when the accelerator handle is rotated.
 an intermediate support structure attached to the guide tube of the front support structure, comprising a support tube attached to a bag support and at least two horizontal frames joined by at least two vertical elements, and comprising a seat;
 a rear support structure attached to the intermediate support structure, comprising a rectangular horizontal frame from which two lateral arms are projected as support for the rear tire; and
 a support mechanism attached to the lower face of the intermediate support structure, comprising a horizontal axis and one or more folding legs joined in angle to the ends of the axis.

19. The compact golf cart according to claim 18, characterized in that the pair of supports for the front tire comprises a pair of side arms joined to the axis of said front tire; and
 the front support structure has a pair of shock absorbers installed on the lower ends of each side arm that supports the front tire axis.

20. The compact golf cart according to claim 18, characterized in that the vehicle further comprises a drive train system consisting of an electric drive train system of the type that is built in the rear tire.

21. The compact golf cart according to claim 18, characterized in that the hook of the brake locking mechanism is attached to the accelerator handle by means of a bracket that surrounds the handle, wherein the brake lever comprises a notch, slit or groove that receives the hook.

22. The compact golf cart according to claim 18, characterized in that the bag support includes a clamping leveling mechanism comprising a hinged connection comprised by at least two elongated elements joined at one end by a bolt, wherein:
 the first element is attached to the support tube, and
 the second element is attached to a clamp;
 wherein at least one spring element is attached to both elements.

23. The compact golf card according to claim 22, characterized in that the clamping leveling mechanism comprises at least six elements: two bolt anchors, two arms and two spring elements, wherein a first anchor is joined to the umbrella support tube of the intermediate support structure, a first arm is attached in one end to the first anchor by means of a bolt that allows it to rotate, and on its opposite end it is attached to a first end of a second arm, also in a hinged manner by means of another bolt, wherein the second end of the second arm is attached to a second anchor in a hinged manner similar to the attachment of the first arm with the first anchor by means of another bolt, wherein a first spring element is attached in one end to the umbrella support tube of the intermediate support structure, and on other end to the first arm, so that said first arm is kept in a flexible perpendicular-horizontal position, wherein a second spring element is attached to the middle part of both arms so that the mechanism keeps the relative position of the arms at an angle lower than 180°, wherein the second anchor is rigidly attached to the clamp; and
 the length of the clamp can be fixed or adjustable, by means of arms of defined dimensions or extensible elements, whether fixed or flexible.

24. The compact golf cart according to claim 18, characterized in that the rear support structure is attached to the intermediate support structure by means of a floating axis and a rear suspension.

25. The compact golf cart according to claim 24, characterized in that the floating axis that joins the intermediate support structure with the rear support structure comprises an axis of the intermediate support structure that is inserted into a tube of the rear support structure with a diameter larger than the diameter of said axis.

26. The compact golf cart according to claim 24, characterized in that the rear suspension comprises a shock absorber that is attached in a hinged manner by means of anchors and bolts to the intermediate support structure on one end and to the rear support structure on the opposite end.

* * * * *